United States Patent [19]

Becker et al.

[11] 4,343,730

[45] Aug. 10, 1982

[54] WATER-IN-OIL EMULSIONS OF POLYMERS OF QUATERNARY AMMONIUM COMPOUNDS OF THE ACRYLAMIDO TYPE

[75] Inventors: Harold L. Becker; Rudolf S. Buriks, both of St. Louis, Mo.

[73] Assignee: Petrolite Corporation, St. Louis, Mo.

[21] Appl. No.: 241,967

[22] Filed: Mar. 9, 1981

[51] Int. Cl.$^3$ ............................................. C08K 5/01
[52] U.S. Cl. .................................. 524/551; 526/923; 210/734
[58] Field of Search ................ 260/29.6 H, 29.6 WQ; 526/923

[56] References Cited

U.S. PATENT DOCUMENTS 2,980,657  4/1961  Melamed ........................... 260/86.1
3,284,393  11/1966  Vanderhoff et al. .............. 260/29.6
3,943,114  3/1976  Hoke .......................... 260/85.5 AM Primary Examiner—Joseph L. Schofer
Assistant Examiner—Bernard Lipman
Attorney, Agent, or Firm—Sidney B. Ring; Hyman F. Glass

[57] ABSTRACT

Water-in-oil emulsions of homopolymers and copolymers of acrylamido alkylene quaternary ammonium salts and their use as sewage treatment acids, demulsifying agents, water clarification aids, etc.

25 Claims, No Drawings

WATER-IN-OIL EMULSIONS OF POLYMERS OF QUATERNARY AMMONIUM COMPOUNDS OF THE ACRYLAMIDO TYPE

This invention relates to polymers and copolymers of acrylamidoalkylene quaternary ammonium salts, said polymers and copolymers prepared in emulsion form; and to the use of said emulsions.

U.S. Pat. No. 2,980,657 dated Apr. 18, 1961 describes and claims polymers and copolymers of acrylamidoalkylene quaternary ammonium salts. However, these compositions are prepared in solution form such as in a continuous phase or as suspensions.

We have now discovered that the compositions of U.S. Pat. No. 2,980,657 can be prepared in emulsion form such as in a W/O emulsion.

In addition, we have discovered that the compositions of U.S. Pat. No. 2,980,657 in emulsion form have a wide variety of novel uses.

The compositions of U.S. Pat. No. 2,980,657 in emulsion form can be prepared in the manner described in U.S. Pat. No. 3,284,393 and these water-in-oil emulsions can be employed in a wide variety of uses.

Although there are water-in-oil emulsion polymers and copolymers now in use as flocculating aids, water clarification aids, papermaking aids, sewage treatment aids, industrial treating aids, petroleum recovery aids, and water flooding aids, all of these compounds exhibit strongly limited performances and specificities when employed for the above uses. However, the products of this invention are less sensitive to variations in performance and exhibit less specificity in many of the above names uses.

Thus, this invention provides greater versatility and a broader range of activity when applied in many of the above named uses.

Emulsion polymerization is also described elsewhere. For example, in accordance with the teachings of U.S. Pat. No. 3,284,393 water-soluble ethylenic unsaturated monomers which are polymerizable, can be polymerized in a water-in-oil emulsion, provided that the derived polymer remains in the discontinuous water phase, and a polymeric latex will result. Such monomers have a water solubility of at least 5 weight percent and include acrylamide, methacrylamide, acrylic acid, methacrylic acid, vinylbenzyldimethylammonium chloride, alkali metal and ammonium salts of 2-sulfoethylacrylate or sodium styrene sulfonate, 2-aminoethylmethacrylate hydrochloride, alkali metal and ammonium salts of vinylbenzyl sulfonates and the like. When aqueous solutions of the monomers are used they can be varied widely in monomer content. Proportions between 100 and 5 percent by weight monomer corresponding to 0 to 95 percent water used, depending upon the monomer and the temperature of the polymerization. The ratio of monomer phase to oil phase is also widely variable, advantageously between 30 and 70 parts of the former to between 70 and 30 parts of the latter by weight. A monomer phase to oil phase ratio of about 70 to 30 is preferred.

The present compositions can be prepared by the methods described in U.S. Pat. Nos. 2,980,687 or 3,284,393 and elsewhere.

The polyquaternary ammonium compounds of the present invention are the linear polymers exclusively of monoethylenically unsaturated monomeric units comprising from 1 to 100 mol. percent, preferably at least 20 mol percent, of amide units of the formula

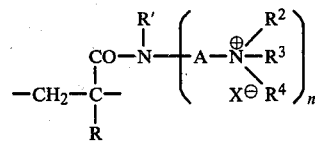

where R is hydrogen or a lower alkyl group having 1 to 3 carbon atoms, R' is hydrogen or a lower alkyl group having 1 to 4 carbon atoms, A is a straight or branched chain alkylene group having 2 to 10 carbon atoms or a divalent saturated aliphatic group consisting of a plurality of alkylene groups of 2 to 10 carbon atoms each pair of which is connected by an ether oxygen atom, $R^2$ and $R^3$ may be (1) separate groups selected individually from the group consisting of alkyl groups having 1 to 12 carbon atoms, hydroxyalkyl groups having 2 to 12 carbon atoms, alkoxyalkyl groups having 2 to 12 carbon atoms, (polyalkoxy)alkyl groups having 2 to 12 carbon atoms, and (2) a single saturated aliphatic group which together with the N atom forms a heterocyclic group containing 5 to 6 atoms in the ring of which 4 to 5 are carbon and which may contain a second atom of the group consisting of O, N, and S, the second atom, if nitrogen, being substituted by an alkyl group having 1 to 18 carbon atoms, $R^4$ is selected from saturated and unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, alkoxyalkyl groups having 2 to 18 carbon atoms, hydroxyalkyl groups having 2 to 18 carbon atoms, an aralkyl or substituted aralkyl group having 7 to 24 carbon atoms, or a phenoxyalkyl group having 7 to 24 carbon atoms, X is OH or a negative, salt-forming atom or radical, and n is an integer having a value from 1 to 2.

A preferred group of the compounds of this invention are those having units of the formula

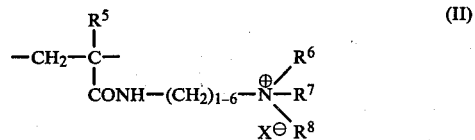

(II)

where $R^5$ is hydrogen or methyl, $R^6$ and $R^7$ are methyl or ethyl, and $R^8$ is a saturated or unsaturated aliphatic hydrocarbon group having 1 to 18 carbon atoms, and X has the same meaning as above. Another preferred group are those having the Formula II in which the symbols have the same meaning except that $R^6$ and $R^7$ form with the adjoining nitrogen atom a morpholino group. Another preferred group are those having the Formula II with the same meanings of the symbols as in the first preferred group except that $R^8$ is an aralkyl group of the class consisting of a benzyl group and alkyl-substituted benzyl "groups" in which the alkyl group has 1 to 18 carbon atoms. Of these several preferred groups, those compounds in which $R^5$ is hydrogen have the advantage in respect to ease of manufacture.

The polymers are of linear character in the sense that they are not cross-linked although they may contain numerous branches from the linear backbone. The linear backbone or chain consists substantially entirely of direct carbon-to-carbon linkages, there being no intervening or interrupting non-carbon atoms except in the terminal units of the polymer. The polymers contain quaternary ammonium groups in side chains or branch groups and such quaternary ammonium groups are connected to the linear backbone by alkyleneamido linkages.

The monomeric quaternary ammonium compounds of this invention used in the preparation of the polymer can be prepared by any of the methods described in U.S. Pat. No. 2,980,657.

Examples of comonomers that may be polymerized with the quaternary ammonium acrylamide monomer include acrylamide and the various substituted acrylamides (e.g., methacrylamide, ethacrylamide, the various N-substituted acrylamides which are different from those used in practicing the present invention and the various N-substituted acrylamides, for instance N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides, e.g., N-monophenyl and -diphenyl acrylamides and methacrylamides, etc.).

Depending upon the particular comonomer selected, the polymer obtained may be water-soluble, to alcohol-soluble, or to any combination of these solubilities. In the present invention the polymer or copolymer should be sufficiently soluble in the inner aqueous phase to polymerize.

In the preferred embodiment this invention relates to emulsions of quaternaries of dialkylamino alkylacrylamides and copolymers thereof, where said quaternaries are in an internal aqueous phase of sufficiently small particle size so as to resist settling; and to a wide variety of uses thereof such as water clarifiers, dewatering aids, demulsifiers, etc.

These are polymers and copolymers of the quaternary

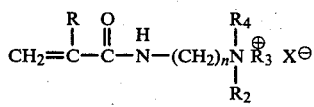

where
R=H or alkyl, preferably methyl
R$_2$ and R$_3$ are alkyl, preferably methyl
R$_4$ is alkyl, cycloalkyl, aryl, arylalkyl, etc., preferably aralkyl, and
X is an anion, preferably halogen
n is for example 1-6, preferably 3.
A representative quaternary is

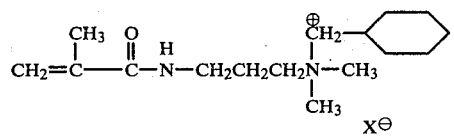

A representative comonomer is acrylamide.

In order to emulsify the monomer phase into the oil phase to give a water-in-oil emulsion an emulsifying agent of the water-in-oil type is used in amount ranging between 0.1 and 10 percent by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the product marketed by Shell Chemical Company under the product name "SHELLFLEX 131." Typical specifications of this hydrocarbon liquid are set forth in the table below:

TABLE 1

| "SHELLFLEX 131" Specifications | | |
|---|---|---|
| Gravity, °API | D-287 | 30.8 |
| Pounds per Gallon | | 7.260 |
| Color, Saybolt | D-156 | +25 |
| Flash, C.O.C., °F. | D-92 | 300 |
| Pour Point, °F. | D-97 | −65 |
| Viscosity, SSU @ 100° F. | D-445/D-2161 | 58.6 |
| Viscosity, SSU @ 210° F. | D-445/D-2161 | 34.4 |
| Aniline Point, °F. | D-611/D-1012 | 182 |
| Viscosity Gravity Constant | | 0.838 |
| Refractive Index @ 10° C. | D-1218 | 1.4752 |
| Clay/Gel Analysis % w | D-2007 | |
| Polar Compounds | | 0.4 |
| Aromatics | | 8.2 |
| Saturates | | 91.4 |
| Distillation, °F. @ 10mm Hg | D-1160 | |
| IBP | | 300 |
| 10% Recovered | | 323 |
| 50% Recovered | | 365 |
| 90% Recovered | | 425 |

Free radical initiators useful in polymerizing ethylenic unsaturated monomers, such as benzoyl peroxide, lauroyl peroxide, 2,2'-azobis (isobutyronitrile), potassium pursulfate and the like are used in the polymerization in amounts ranging between 0.002 to 0.2 percent by weight of the oil or monomer phase, depending upon the solubility of the initiator. Polymerization can also be carried out using high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon nomoner and reaction variables. Products obtained by these procedures consisting of water swollen particles, 2 microns or smaller in size, suspended in the external phase are stable suspensions. High energy or ultraviolet irradiation polymerization is carried out at room temperature or above or below room temperature, as desired.

It is desirable that the emulsions and/or suspensions do not settle. The particles are preferably so small such as 2 micron or less, that a stable emulsion and/or suspension is formed. Preferably the molecular weight of the polymer is on the higher side, for example about 200,000 or higher, for example from about 500,000 to 2,000,000 or higher.

Aqueous solutions of the monomers to be polymerized can be varied widely in monomer content, i.e., from about 5 to 75 weight percent of monomer(s) in water, depending upon the monomer(s) and the polymerization temperature. The ratio of aqueous monomer phase to oil phase is also widely variable, advantageously from about 5 to 95 weight parts of aqueous phase to 95 to 5 parts of oil phase.

The oil phase can be any inert hydrophobic liquid. Of such liquids the hydrocarbons and chlorinated hydrocarbons such as toluene, xylene, o-dichlorobenzene, monochlorobenzene, propylene dichloride, carbon tetrachloride, etc. are advantageously used.

This embodiment of this invention illustrates that by altering slightly the solubilities of cationic polymers and copolymers of acrylamide and the benzyl chloride quaternary of dimethylaminopropyl methacrylamide by judicious charges of each monomer, the range of useful activity can be greatly enhanced.

British Pat. No. 757,285 teaches the method of producing N,N-dimethylamino-N-propylmethacrylamide. This material is now available in quantity from the Jefferson Chemical Company and sold under the trade name DMAPMA.

EXAMPLE A

Preparation of N,N-dimethyl N-propyl methacrylamide N-benzyl ammonium chloride (DMAPMA.BzCl)
891 parts Water
510 parts DMAPMA
380 parts Benzyl Chloride (BzCl)

Process description for quaternization

To a clean and dry 2 liter four necked flask, equipped with a water cooled condenser, subsurface air sparge, bubble chamber, dropping funnel, immersion thermometer, stirring motor and external water heating bath, 510.50 parts DMAPMA and 222.66 g of water are charged. Subsurface air sparging is begun and the reactor and contents are brought to 60° C. When the temperature is stable @ 60° C., dropwise addition of 380.14 parts of BzCl is begun. (Air sparging is continued throughout.) The dropwise addition of BzCl is accomplished over a 2½ hr. period. After all BzCl has been charged 2 hrs. additional heating @ 60° C. is required. After these 2 hrs. the second addition of water is made at a temperature no greater than 80° C.

EXAMPLE 1

Preparation of high molecular weight cationic polymers (a) Internal Phase
    909 parts 50% aq. DMAPMA.BzCl
    The above solution is adjusted to pH 6.1.
(b) External Phase
    480 parts Shellflex 131
    60 parts Sorbitan Monooleate
    0.45 parts 2,2'-Azobis(isobutyronitrile) in
    15 parts monochlorobenzene
(c) Emulsion preparation and polymerization A reactor is charged with the external phase and subjected to maximum vacuum to remove air and oxygen. When frothing subsides the reactor is closed with vacuum remaining. The internal phase is suction transferred to the well stirred reactor content. When all internal phase has been transferred and a good emulsion formed a nitrogen sparge is conducted subsurface @ 10–12 psi for 30 min. or until an acceptable oxygen content is obtained. At this stage a monomer emulsion with droplets of diameter 2 microns or less is obtained. After an acceptable oxygen content is obtained the reactor and contents are brought to a kick off temperature of 55°–60° C. @ a max pressure of 10–12 psi. The temperature is maintained @ 55°–60° C. for 3 hrs. or until exotherm is observed to subside. After the exotherm has occurred the temperature is raised gradually over a period of 2 hrs. to a maximum of 75° C. and held for 6 hrs. The product so obtained is a stable suspension of micron size particles in oil.

EXAMPLE 2

Preparation of Acrylamide DMAPMA.BzCl Copolymer (a) Internal Phase
    309.17 parts water
    147.0 parts Acrylamide
    614.0 parts 50% Aq. DMAPMA.BzCl
    0.6 parts Na$_2$EDTA The pH is adjusted to 5–6
(b) External Phase
    280 parts Shellflex 131
    60 parts Sorbitan Monooleate
    0.6 parts 2,2'-Azobis(isobutyronitrile) in
    14.4 parts mono-chlorobenzene
(c) Emulsion preparation and polymerization A reactor is charged with the external phase and subjected to maximum vacuum to remove air and oxygen. When frothing subsides the reactor is closed with vacuum remaining. The internal phase is suction transferred to the well stirred reactor content. When all internal phase has been transferred and a good emulsion formed a nitrogen sparge is conducted subsurface @ 10–12 psi for 30 min. or until an acceptable oxygen content is obtained. After an acceptable oxygen content is obtained the reactor and contents are brought to a kick off temperature of 55°–60° C. @ a max pressure of 10–12 psi. The temperature is maintained @ 55°–60° C. for 3 hrs. or until exotherm is observed to subside. After the exotherm has occurred the temperature is raised gradually over a period of 2 hrs. to a maximum of 75° C. and held for 6 hrs. A stable suspension of micron size particles in oil is obtained.

In summary, the emulsions of this invention which are stable and/or non-setting contain an aqueous internal phase and a non-aqueous external phase such as a suitable hydrocarbon including aliphatic, aromatic, cycloaliphatic, or mixtures thereof, etc. The internal phase, including the polymer, comprises at least about 5% by weight of the total emulsion, such as from about 5 to 95%, for example from about 30 to 85%, but preferably from about 55 to 80%.

The polymer in the internal phase comprises at least about 5% by weight of the internal phase such as from about 5 to 75%, for example from about 25 to 65%, but preferably from about 40 to 60%.

The polymer in the internal phase is a homo- or copolymer of an acrylamidoalkylene quaternary ammonium salt monomer.

The preferred monomer is a N,N-dialkylamino N-alkylene methacrylamide or acrylamide as the N-aralkyl ammonium halide, for example N,N-dimethyl n-propyl methacrylamide N-benzyl ammonium chloride. The preferred comonomer is an acrylamide. The molar ratio of acrylamide to N,N-dialkylamine N-alkylene methacrylamide N-aralkyl ammonium halide can vary from about 99 to 1, such as from about 25 to 1, for example from about 5 to 1, but preferably from about 2 to 1.

Dewatering of Sludges

This phase of the invention relates to improvements in the treatment of sewage by agglomerating suspended particles with the aid of cationic polyelectrolyte polymers.

In the treatment of sewage it is necessary that suspended particles be removed. This may be accomplished by adding an agglomerating or flocculating agent to aid in the precipitation coagulation filtration, or settling of suspended particles. In the past inorganic materials, such as alum, lime, ferrous or ferric salts, etc. have been added to speed up settling and to aid in filtration. Such prior conventional flocculants may be used in conjunction with the present novel flocculating agents, or the present agents may be used alone.

Changes in the composition of domestic sewage have resulted from the use of synthetic detergents instead of soap for washing and general cleaning. Both industrial and household wastes at present may contain considerable quantities of synthetic detergents which keep solid materials suspended. It thus appears that the purpose of the synthetic detergents, as used by the housewife, is to suspend and keep suspended the very particles which in sewage treatment are to be settled out. Many of the synthetic detergents are anionic in character.

It has now been found that if there is added a cationic polyelectrolyte polymer, which in solution has a positive charge on the polymer, which polymer may be considered as derived from a nitrogen base, and which is water-dispersible, such polymer reacts with the synthetic detergent suspending agents, so that it neutralizes the charge on the detergent, and thus permits the natural settling of the particles. Actually, the cationic polyelectrolyte polymers act as flocculating agents and actually assist in causing the rapid precipitation or flocculation of solid particles thus serving a double function. The dual effect of both neutralizing the anionic suspending agents and also causing a flocculating effect in their own right results in the cationic polyelectrolyte polymers markedly increasing the rate of settling of solids.

It is to be appreciated that an increase in the settling rate of solids is of greatest immportance; as for example in a sewage treatment plant for a community a doubling of the settling rate in effect doubles the capacity of the settling tanks, so that by merely introducing a new flocculating agent, which will double the settling rate, the capacity of the sewage treatment plant is doubled. With the increase in size of many communities and the overloading of sewage treatment plants which have been previously built, the economic advantages of doubling the capacity of a sewage treatment plant by merely changing the flocculant being used, is easily apparent. Actually the present flocculating agents in many instances will more than double the settling rate and depending upon other conditions will give other advantages, such as a higher density to the settled particles, and an improved filtration rate if filtration is being used in addition to settling.

This phase of the present invention is primarily directed to domestic wastes or industrial wastes in which synthetic detergents are present to suspend solid particles. However, many other organic wastes from other sources will also have varying amounts of anionic suspending agents present.

This phase of the present invention may be used sucessfully with various methods of sewage treatment, such as sludge filtration, or digested sludge filtration, activated sludge, or other methods of sewage treatment in which a settling or filtration step is used.

We have discovered that the compositions of the present invention can be employed in such treatment.

Resolving Emulsions

This phase of the invention relates to a process for resolving or separating emulsions of the oil-in-water class, by subjecting the emulsion to the action of the compositions of this invention.

Emulsions of the oil-in-water class comprise organic oily materials, which, although immiscible with water or aqueous or non-oily media, are distributed or dispersed as small drops throughout a continuous body of non-oily medium.

Industrial emulsions of oily materials in water or other non-oily media are encountered, for example, in sewage disposal operations, milk and mayonnaise processing, marine ballast water disposal. In cleaning the equipment used in processing such products, oil-in-water emulsions are inadvertently, incidentally, or accidentally produced. The disposal of aqueous wastes is, in general, hampered by the presence of oil-in-water emulsions.

Steam distillation and other production procedures sometimes cause oil-in-water emulsions to be produced, from which the valuable oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

Among the most important emulsions of non-saponifiable material in water are petroleum oil-in-water emulsions.

Oil-in-water emulsions contain widely different proportions of dispersed phases. Where the emulsion is a waste product resulting from the flushing with water of manufacturing areas or equipment, the oil content may be only a few parts per million. Naturally-occurring oil-field emulsions of the oil-in-water class carry crude oil in proportions varying from a few parts per million to about 20%, or even higher in rare cases.

This phase of the present invention relates to emulsions containing as much as 20% dispersed oily material, many if not most of them contain appreciably less than this proportion of dispersed phase.

The present process, as stated above, appears to be effective in resolving emulsions containing up to about 20% of dispersed phase.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced.

The process which constitutes the present invention consists in subjecting an emulsion of the oil-in-water class to the action of the compositions of this invention, thereby causing the oil particles in the emulsion to coalesce sufficiently to rise to the surface of the non-oily layer (or settle to the bottom, if the oil density is greater), when the mixture is allowed to stand in the quiescent state after treatment with the compositions of this invention.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The compositions of this invention may be employed alone, or they may in some instances be employed to advantage admixed with other and compatible oil-in-water demulsifiers.

The process is commonly practised simply by introducing small proportions of the compositions of this invention into an oil-in-water-class emulsion, agitating to secure distribution of the reagent and incipient coalescence, and letting stand until the oil phase separates. The proportion of the compositions required will vary with the character of the emulsion to be resolved. Ordinarily, proportions of the composition required are from 1/5,000 to 1/500,000 the volume of emulsion treated; but more is sometimes required.

In some instances, importantly improved results are obtained by adjusting the pH of the emulsion to be treated, to an experimentally determined optimum value.

The composition feed rate also has an optimum range, which is sufficiently wide, however, to meet the tolerances required for the variances encountered daily in commercial operations. A large excess of the compositions of this invention can produce distinctly unfavorable results.

The manner of practicing the present invention is clear from the foregoing description.

The compositions of this invention are useful in the clarification of water containing emulsified oil or suspended oily solids. The application is especially effective for the resolution of (1) oil-in-water emulsions resulting from refinery processes, (2) oil-in-water emulsions as encountered in oil fields, and (3) emulsions of cutting and rolling oils from metal working industries. The compositions of this invention may be used in simple settling tanks or basins.

They are particularly effective as such a reagent in flotation systems.

Removal of Oils and Solids from Aqueous Systems

In the present process, to remove oils, or solids, or combinations thereof, from aqueous systems, the reagent is introduced at any convenient point in the system, and it is mixed with the oils or solids in any desired manner, such as by being pumped or circulated through the system or by mechanical agitation such as paddles or by gas agitation. After mixing, the mixture of oils or solids and reagent is allowed to stand quiescent until the constituent phases of the emulsion separate. Settling times and optimum mixing times will, of course, vary with the nature of the oil or solid and the apparatus available. The operation, in its broadest concept, is simply the introduction of the reagent into the oils or solids, the mixing of the two to establish contact and promote coalescence, and, usually, the subsequent quiescent settling of the agitated mixture, to produce the aqueous and non-aqueous phases as stratified layers.

Agitation may be achieved in various ways. The piping system through which the oil- or solids-containing system passed during processing may itself supply sufficient turbulence to achieve adequate mixing of reagent and system. Baffled pipe may be inserted in the flow sheet to provide agitation. Other devices such as perforated-chamber mixers, excelsior- or mineral- or gravel- or steel-shaving-packed tanks, beds of stone or gravel or minerals in open ducts or trenches may be employed beneficially to provide mixing. The introduction of a gas, such as natural gas or air, into a tank or pipe in which or through which the mixture of reagent and system is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered dialy in commercial operations.

Application of a suitable gas in a procedure approximating that of the froth flotation cell employed in ore beneficiation, after the present reagent has been added to the system to be resolved, frequently has a favorable influence of totally unexpected magnitude. By incorporating the step of subjecting the chemicalized (i.e., containing the reagent) system to the action of air in a sub-aeration type flotation cell, a clear aqueous layer is sometimes obtained in a matter of seconds, without added quiescent settling and with approximately as much reagent. Natural gas was found to be as good a gaseous medium as was air, in this operation.

It should be distinctly understood that such aeration technique, while an important adjunct to the use of the present reagent, in some cases, is not an equivalent procedure. This may be proved by subjecting an unchemicalilzed system to aeration for a period of minutes without detectable favorable effect. Addition of the reagent to such aerated system will produce resolution, promptly.

The details of the mechanical structures required to produce aeration suitable for the present purpose need not be given here. It is sufficient to state that any means capable of producing small gas bubbles within the body of the system is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

Suitable aeration is sometimes obtainable by use of the principle of Elmore, U.S. Pat. No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Door "Vacuator."

The manner of practicing the present invention using aeration is clear from the foregoing description.

The order in which the compositions of this invention and the aeration step are applied is relatively immaterial. Sometimes it is more convenient to chemicalize the system and subsequently to apply the aeration technique. In others, it may be more advantageous to produce a strongly frothing system and then introduce the compositions into such aerated system.

Any desired gas can be substituted for air. Other commonly suitable gases include natural gas, nitrogen, carbon dioxide, oxygen, etc., the gas being used essentially for its levitation effect. If any gas has some deleterious effect on any component of the system, it will obviously be desirable to use instead of some other gas which is inert under the conditions of use.

The amount of compositions of this invention used will vary depending on the particular composition, the particular system, etc. In general, the amount of composition employed in the system is at least about 0.5 ppm, such as from about 1.0 to 60 ppm, for example from about 5 to 40 ppm, but preferably from about 3.0 to 30 ppm. Larger amounts may be used but there is generally no cost/performance reason for so doing.

WEMCO Depurator Flotation Machine is a flotation machine for removal of emulsified oily wastes and suspended solids from petroleum industry wastewater.

The WEMCO Depurator unit employs mechanically-induced air flotation to separate solids, oils, or organic materials from refinery or oil field effluent in larger volumes, in less space, and at lower cost than any other machine. It can clean large quantities of wastewater containing from 200 to 5,000 ppm of oil, depending on the type of oil and emulsion. In most applications, less than 10 ppm of oil remain after a four-minute cleaning cycle.

It is available in a variety of sizes to handle from 1,720 to 171,000 barrels of wastewater per day. Depurator machines can be installed at costs 15-40% less than other comparable flotation equipment. Maintenance costs are lower, too. The Depurator unit also requires at least 50% less space than comparable equipment for its volume capacity. Over 300 successful field installations to date.

WEMCO Depurator units are composed of four standard WEMCO flotation cells. Each cell is equipped with a motor-driven self-aerating rotor mechanism. As the rotor spins, it acts as a pump, forcing water through a disperser and creating a vacuum in the standpipe. The vacuum pulls gas into the standpipe and thoroughly mixes it with the wastewater. As the gas/water mixture travels through the disperser at high velocity, a shearing force is created, causing the gas to form minute bubbles. Oil particles and suspended solids attach to the gas bubbles as they rise to the surface. The oil and suspended solids gather in a dense froth on the surface, are removed from the cell by skimmer paddles and collected in external launders.

In the majority of applications, natural gas or nitrogen is used to form the bubbles. The absence of oxygen prevents the growth of harmful bacteria and also reduces downstream corrosion. A pressure of 0.50 to 1.0 ounce maintains a gas blanket between the liquid level and gas-tight cover. When air is used, it is induced by the Depurator machine at atmospheric pressure. Self-induced mechanical air flotation eliminates need for auxiliary air compressors or blowers.

Processing is often improved with the aid of a chemical injected into the water upstream from the float cell. These compounds break oil-in-water emulsions, gather suspended solids, and stabilize the air bubbles to promote froth flotation.

The Depurator machine consists of a self-supporting, all-steel skid-mounted tank, with integral float-collecting flumes and gas-tight covers. Tank interior is high-temperature epoxy coated for greatest corrosion resistance. Inspection doors are provided on both sides of the tank, plus a breather valve and pneumatic liquid level controller.

Each standpipe is equipped with gas intake ports beneath the gas-tight cover. A separate motor powers each rotor/disperser mechanism. Two $\frac{1}{4}$ horsepower gearmotors drive the skimmer assemblies. All motors are explosion-proof, 3 phase, 60 cycle, 230/460 volt.

The following are the major petroleum industry applications.

Refinery Process Water

At the refinery, the Depurator wastewater treatment generally follows gravity oil-water separation. The wastewater includes process water from desalters, tank and water drawoffs, steam stripping condensate, pump gland cooling, barometric condenser, treating plant wash, caustic treatment, and loading facility washdown. It may also include storm run-off water.

The Depurator device is first choice for secondary wastewater treatment because, unlike gravity oil-water separators, it will break emulsions with appropriate chemical additives. More than a dozen successful installations are currently in refinery operation.

Petrochemical Wastewater

Wastewater created in the production of bulk chemicals derived from natural gas or petroleum is often distinguished from the usual oil refinery product by special characteristics. No single oil/water separation method has proven capable of handling all the compounds produced. The flotation process, as employed by the WEMCO Depurator machine, has proven to be the best wastewater treatment for many of these oils and suspended solids. Bench tests are recommended for each specific application.

Ballast Water

Rarely is it possible to discharge water directly into the bay or waterway from ballast water storage tanks. Depurator units take the water from the storage tank and make the precise oil-water separation necessary to meet government clean water standards. Depurator flotation machines, with appropriate chemical additives, can break emulsions and reduce oily waste content of ballast water to lower levels than any other flotation process.

Oil Field Production Water

The Depurator machine wrings almost the final drops of oil from produced water. After initial treatment by gravity oil/water separators, such as free water knockouts, gun barrels and skim tanks, oilfield water can be terminally cleaned to most community and company standards by the WEMCO Depurator machine. Depurator units will remove the emulsified oil left by preliminary water treatment which could prevent formation plugging and reduce pump efficiency when the water is to be reinjected for water flooding. For steam flooding, the Depurator unit is used ahead of boiler pretreatment equipment.

If the wastewater is to be disposed of by percolation ponds, or returned to existing waterways, the Depurator machine has consistently proven its ability to clean the water to local, state and federal standards.

The following use examples are presented for purposes of illustration and not of limitation.

A specific example of the enhanced activity of this new inverse emulsion copolymer of acrylamide/N,N-dimethyl N-propyl methacrylamide N-benzyl ammonium chloride (A) is illustrated in a performance profile comparing it to a similar cationic copolymer (B) which differs in the type of quaternary ammonium monomer used in its make-up.

The test measures the relative effectiveness of these compounds in the dewatering of raw primary sludge. The performance profile is generated by conditioning 100 ml of sludge with various chemical dosages, mixing, and subsequent measurement of capillary suction time (CST) as given in seconds. The results of these measurements appear in the following table:

TABLE I

| Compound | ppm Compound | CST (sec) |
|---|---|---|
| (A) | 400 | 10 |
| (B) | 400 | 42 |
| (A) | 600 | 7 |
| (B) | 600 | 29 |
| (A) | 1,000 | 5 |
| (B) | 1,000 | 15 |

Compound B is a commercial acrylic type quaternary polymer of a different type. The use of monomers in the present invention with Benzyl quaternary groups leads to copolymers with substantially enhanced activity. The copolymer particles are sufficiently small so that they do not settle out of the emulsion.

A second specific example of the enhanced activity of this new inverse emulsion copolymer (A) as compared to (B) above is illustrated at a different area and by a different method.

The test method measures the relative effectiveness of these compounds in the dewatering of activated sludge. The performance profile is generated by conditioning 100 ml of sludge with various chemical dosages, mixing, and subsequent measurement of the volume of filtrate obtained through a No. 54 Whatman filter and Buchner funnel with a constant vacuum source after a given number of seconds. The results of these measurements are presented in the following table:

TABLE II

| Compound | ppm Compound | ml Filtrate | Time (sec) |
|---|---|---|---|
| (A) | 150 | 40 | 180 |
| (B) | 150 | 27 | 180 |
| (A) | 300 | 66 | 180 |
| (B) | 300 | 52 | 180 |
| (A) | 75 | 33 | 180 |
| (B) | 75 | 27 | 180 |

EXAMPLE 3

This example of the enhanced activity of this new inverse emulsion copolymer (A) as compared to (B) above is illustrated at a Refinery in a full scale test.

The test method measures the relative effectiveness of these compounds in removing oil and grease from refinery effluent. Concentrated floucculant was carefully metered into a dilution stream which was carried through an in-line, static mixer and added to the influent line of an air induced flotation apparatus. Samples were collected after 45 minutes of continuous operation from the influent to each cell and the final effluent. These samples were analyzed for free oil and grease and residual turbudity with the following results:

TABLE III

| Compound | ppm | Removal % Turbidity | Efficiency % Free Oil and Grease |
|---|---|---|---|
| (A) | 5.0 | 87 | 95 |
| (A) | 3.3 | 67 | 89 |
| (A) | 10.1 | 89 | ≈100 |
| (A) | 1.31 | 0 | 76 |
| (B) | 9.68 | 80 | 97 |
| (B) | 5.34 | <0 | 29.2 |
| (B) | 16.2 | 86 | 98 |
| (B) | 6.7 | 9 | 47 |

We claim:

1. A stable emulsion of an aqueous internal phase in a non-aqueous external phase, said aqueous internal phase containing a homo- or a copolymer of an acrylamido alkylene quaternary ammonium salt.

2. The emulsion of claim 1 where the internal phase, including the polymer, comprises at least about 5% by weight of the total emulsion.

3. The emulsion of claim 2 where the internal phase comprises at least 55 to 85% by weight of the total emulsion.

4. The emulsion of claim 1 where the polymer in the internal phase is at least about 5% by weight of the total emulsion.

5. The emulsion of claim 4 where the polymer in the internal phase is at least about 40 to 60% by weight of the total emulsion.

6. The emulsion of claim 1 where the polymer is a homopolymer.

7. The emulsion of claim 2 where the polymer is a homopolymer.

8. The emulsion of claim 3 where the polymer is a homopolymer.

9. The emulsion of claim 4 where the polymer is a homopolymer.

10. The emulsion of claim 5 where the polymer is a homopolymer.

11. The emulsion of claim 6 where the homopolymer is derived from N,N-dimethyl N-propyl methacrylamido N-benzyl ammonium chloride.

12. The emulsion of claim 7 where the homopolymer is dervied from N,N-dimethyl N-propyl methacrylamido N-benzyl ammonium chloride.

13. The emulsion of claim 8 where the homopolymer is derived from N,N-dimethyl N-propyl methacrylamido N-benzyl ammonium chloride.

14. The emulsion of claim 9 where the homopolymer is derived from N,N-dimethyl N-propyl methacrylamido N-benzyl ammonium chloride.

15. The emulsion of claim 10 where the homopolymer is derived from N,N-dimethyl N-propyl methacrylamido N-benzyl ammonium chloride.

16. The emulsion of claim 1 where the polymer is a copolymer.

17. The emulsion of claim 2 where the polymer is a copolymer.

18. The emulsion of claim 3 where the polymer is a copolymer.

19. The emulsion of claim 4 where the polymer is a copolymer.

20. The emulsion of claim 5 where the polymer is a copolymer.

21. The emulsion of claim 16 where one monomer is N,N-dimethyl n-propyl methacrylamido N-benzyl ammonium chloride and the comonomer is acrylamide.

22. The emulsion of claim 17 where one monomer is N,N-dimethyl n-propyl methacrylamido N-benzyl ammonium chloride and the comonomer is acrylamide.

23. The emulsion of claim 18 where one monomer is N,N-dimethyl n-propyl methacrylamido N-benzyl ammonium chloride and the comonomer is acrylamide.

24. The emulsion of claim 19 where one monomer is N,N-dimethyl n-propyl methacrylamido N-benzyl ammonium chloride and the comonomer is acrylamide.

25. The emulsion of claim 20 where one monomer is N,N-dimethyl n-propyl methacrylamido N-benzyl ammonium chloride and the comonomer is acrylamide.

* * * * *